July 4, 1961  J. W. WRIGHT ET AL  2,991,012
THERMOSTATIC CONTROL VALVE
Filed June 13, 1958  3 Sheets-Sheet 1

July 4, 1961  J. W. WRIGHT ET AL  2,991,012
THERMOSTATIC CONTROL VALVE
Filed June 13, 1958  3 Sheets-Sheet 2

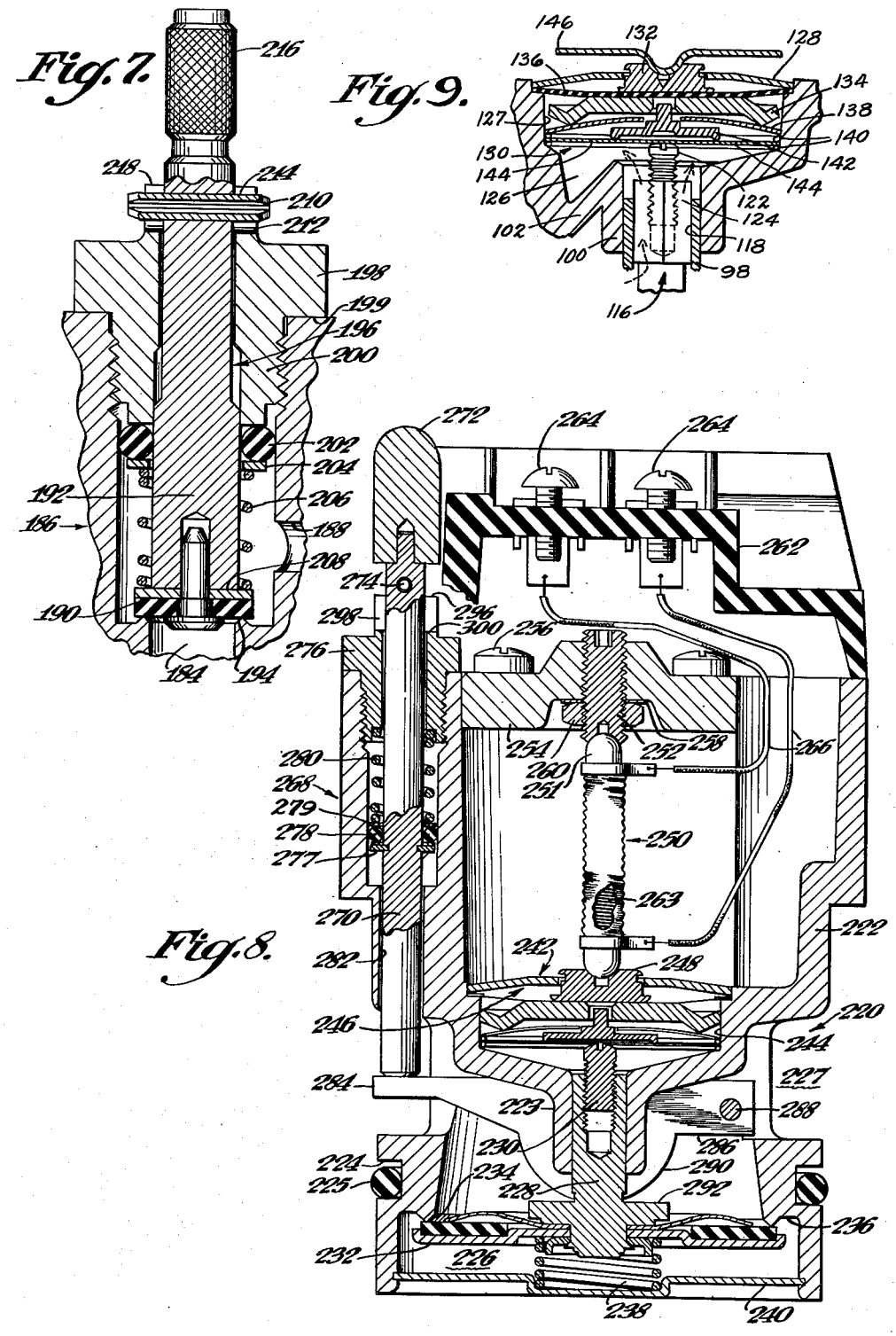

2,991,012
Patented July 4, 1961

2,991,012
THERMOSTATIC CONTROL VALVE
John W. Wright, Long Beach, Wilbur F. Jackson, Compton, and Marvin M. Graham, Rolling Hills, Calif., assignors to Robertshaw-Fulton Controls Company, Richmond, Va., a corporation of Delaware
Filed June 13, 1958, Ser. No. 741,892
5 Claims. (Cl. 236—48)

This invention relates generally to thermostatic control valves and more particularly to combined snap-acting and throttle valves for regulating fluid flow to gas fired heaters and the like in response to temperature changes in a space to be heated.

In the use of space heaters, it is desirable that stratification of the air in the space to be heated be held to a minimum. This can be accomplished by throttling down the flow of fuel to the heater so as to slow down the room temperature rise and prolong the "burner on" time, thereby effecting a longer period of thermal convection.

It is an object of this invention to regulate the flow of fuel to a space heater so as to minimize the stratification of the air in the space to be heated.

Another object of this invention is to calibrate the snap-acting and throttle valves for operation in a desired sequence.

Another object of this invention is to utilize the preliminary graduating movement of a snap-action mechanism for effecting a throttling action of a control valve of the indicated type.

Another object of this invention is to construct a thermostatic valve of the indicated type with a removable cartridge which contains a snap-throttle control mechanism.

In a preferred embodiment of the invention, a casing is provided with an inlet and an outlet and defines a cavity for receiving a snap-throttle cartridge. When the snap-throttle cartridge is mounted on the casing, it provides a partition between the inlet and the outlet. This partition defines a main valve seat communicating with the inlet. A thermostat responsive to the temperature of the space to be heated is mounted on the cartridge and controls the movement of a main valve member cooperable with the main valve seat and the operation of an auxiliary valve means so as to control the flow from the inlet to the outlet. The thermostat is operative to actuate the main and auxiliary valve means between a closed position, a minimum flow position, a medial flow position and a maximum flow position in response to the temperature condition of the space to be heated.

Figure 1:
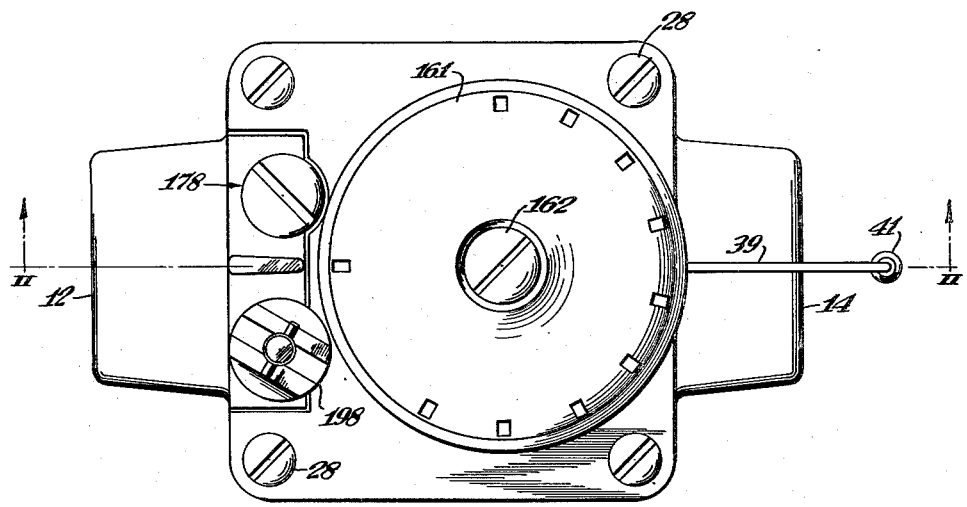
Figure 2:
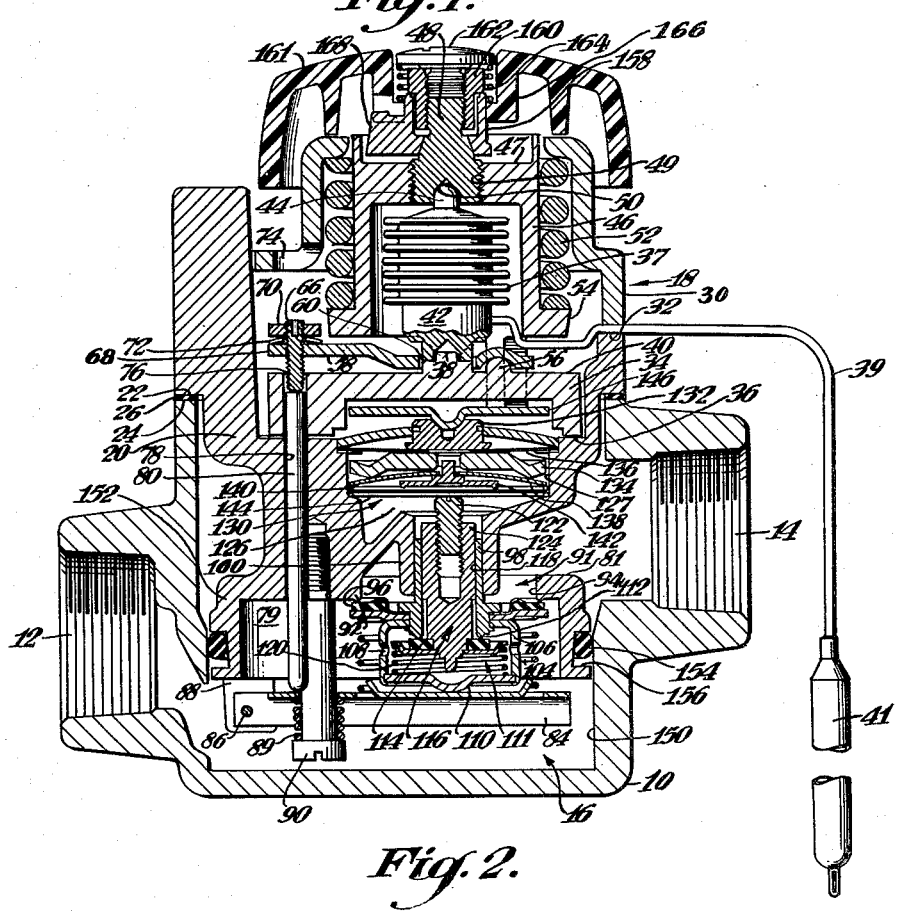
Figure 3:
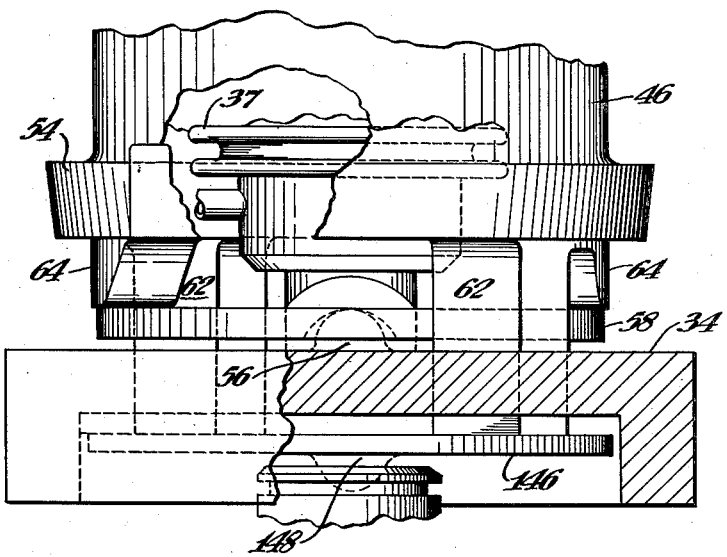
Figure 5:
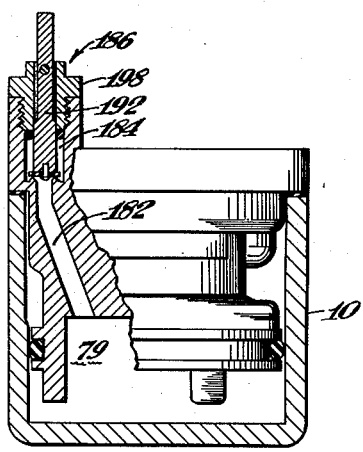
Figure 4:
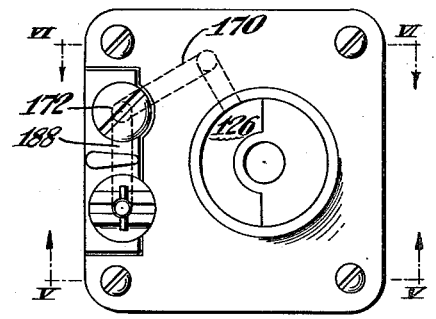
Figure 6:
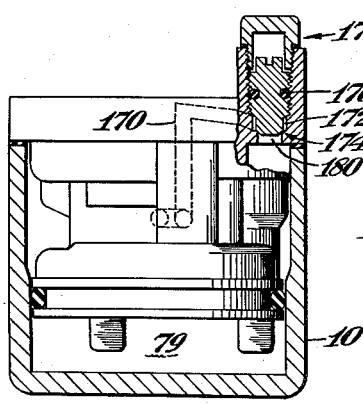

The above and other objects and features of the invention will appear more fully hereinafter from a consideration of the following description taken in connection with the accompanying drawings wherein:

FIG. 1 is a plan view of a preferred embodiment of the invention;
FIG. 2 is a cross-section taken on the line II—II of FIG. 1;
FIG. 3 is a partial section of a detail of FIG. 2;
FIG. 4 is a partial plan view of a detail of FIG. 1;
FIG. 5 is a cross-section with cut away portions taken on line V—V of FIG. 4;
FIG. 6 is a cross-section with cut away portions taken on line VI—VI of Fig. 4;
FIG. 7 is an enlarged fragmentary view of a detail of FIG. 5;
FIG. 8 is a cross-section of a modified form of a detail of the invention; and
FIG. 9 is an enlarged view of a detail shown in FIG. 2.

Referring now more particularly to FIGS. 1 and 2, the snap-throttle control valve illustrated therein comprises a casing 10 having an inlet 12 and an outlet 14 and defining a generally cylindrical cavity 16 therebetween adapted to receive a cylindrical snap-throttle control cartridge 18. The cartridge body 20 is formed with a shoulder 22 adapted to be mounted by means of screws 28 on the top 24 of casing 10 with a suitable seal 26 therebetween. A substantially cup-shaped cover 30 is attached in an inverted position to the top shoulder 32 of cartridge body 20 by means of screws (not shown).

A cup-shaped support member 34 rests in an inverted position on an inwardly projecting shoulder 36 on cartridge body 20. An expansible and contractible bellows 37 rests in a vertical position on a cylindrical boss 38 on base portion 40 of support member 34. The bellows 37 contains a suitable thermally responsive fluid and communicates through a capillary tube 39 with a temperature sensing bulb 41 positioned in the space where the temperature is to be controlled. While the bottom end 42 of bellows 37 is confined against movement by support member 34, the top end 44 of bellows 37 is vertically movable on expansion or contraction of the same.

An actuating mechanism is provided for transmitting the vertical movement of bellows 37 and comprises a cup-shaped actuating member 46 having a temperature adjusting plug 48 threadedly mounted in a central aperture 49 in the base portion 47 of actuating member 46. Plug 48 has a recess 50 for reception of the top end 44 of bellows 37. Actuating member 46 is biased into engagement with bellows 37 by means of power spring 52 mounted in compression between the underside of cover 30 and an outwardly projecting flange 54 formed at the bottom of actuating member 46. Hence, the actuating member 46 is moved vertically by expansion and contraction of bellows 37.

Formed on the base portion 40 of support member 34 is a spherical boss 56 which serves as a fulcrum for a throttle lever 58 which has a central bore 60 through which cylindrical boss 38 extends. As best shown in FIG. 3, support member 34 has a pair of diametrically opposed holes near the periphery thereof through which project two downwardly extending legs 62 formed on actuating member 46. Actuating member 46 also has a pair of shorter legs 64 which bear against throttle lever 58 at opposed positions.

A calibrating screw 66 is mounted on the freely movable end 68 of throttle lever 58 and is locked into a predetermined position by means of a nut 70 and lock washer 72. Calibrating screw 66 can be reached through an opening 74 formed thereabove in cover 30 and is positioned for vertical movement in a vertical bore 76 in support member 34. Another vertical bore 78 is formed in cartridge body 20 in axial alignment with vertical bore 76. Calibrating screw 66 engages the top end of rod 80 slidably mounted within bores 76 and 78 and extending downwardly into an inlet chamber 79 defined by cavity 16 and partition 81 of cartridge body 20. The bottom end of rod 80 engages a medial portion of a throttle lever 84 pivotally mounted in inlet chamber 79 on a pin 86 carried by a pair of bosses 88 formed on cartridge body 20.

Means are provided for biasing throttle lever 84 upwardly into engagement with rod 80 which in turn biases throttle lever 58 upwardly into engagement with legs 64 of actuating member 46. Such means takes the form of a spring 89 mounted in compression between the underside of throttle lever 84 and a shoulder screw 90 threaded into cartridge body 20.

The throttle valve 91 includes a valve seat 92 formed on the inlet side of a bore 94 in partition 81 defining a passageway between inlet chamber 79 and outlet 14. A valve disc 96 is secured to a hollow valve stem 98 vertically slidable in a valve guide portion 100 formed in a rib section 102 of cartridge body 20. Valve disc 96 is biased toward engagement with valve seat 92 by a valve spring 104 mounted in compression between the underside of valve disc 96 and the upper side of throttle lever 84 which is positioned directly beneath valve disc 96. A cylindrical cage member 106 is secured to valve stem 98 on the underside of valve disc 96. Cage member 106 has a plurality of openings 108 in the side walls thereof and has a base portion 110 engageable with throttle lever 84.

The snap-acting valve 111 comprises a valve seat 112 formed within cage member 106 on the bottom end of hollow stem 98 and a valve disc 114 secured to a square valve stem 116 slidable within the central bore 118 of hollow valve stem 98. A valve spring 120 is mounted in compression between the inner side of base portion 110 of cage member 106 and valve disc 114 to bias the same toward valve seat 112. For a purpose to be hereinafter described, an abutment pin 122 is threadedly mounted in the upper end 124 of square or otherwise non-circular valve stem 116 and extends into a snap-action chamber 126 defined by a recess 127 in cartridge body 20 and a seal retainer 128 of a conventional overcenter clicker device 130. The clicker device 130 is comprised of a thrust button 132, which is mounted on retainer 128, and a plunger 134, which rests against a diaphragm and gasket seal 136. Plunger 134 is used to operate a clicker 138 with conventional fulcrum rings 140, fulcrum button 142, and fulcrum lever 144, all mounted within recess 127.

As is well known, the clicker 138 moves between an inoperative and an operative position through an overcenter position with a snap-action in response to an applied force on thrust button 132. The clicker device is positioned to engage abutment pin 122 while moving through these operating positions to thereby cause vertical movement of valve stem 116. Actuating member 46 supplies the applied force necessary to actuate the clicker device 130 between its operating positions. This action is accomplished by means of a resilient circular thrust plate 146 which is mounted for engagement, at a central dimple 148 on its underside, with thrust button 132 and, at the periphery of its upper side, with legs 62 of actuating member 46. Hence, thrust plate 146 provides a self-aligning connection between actuating member 46 and thrust button 132.

Actuating member 46 is also operative to transmit the movement of bellows 37 to throttle valve disc 96. By means of legs 64, the vertical movement of actuating member 46 in response to expansion and contraction of bellows 37 causes throttle lever 58 to rotate about spherical boss 56. This movement of throttle lever 58 is transmitted to throttle lever 84 by means of calibrating screw 66 and rod 80. Throttle lever 84 will thus pivot on pin 86 to cause movement of valve disc 96 by contact with base portion 110 of cage member 106 or by the action of spring 104 on valve disc 96.

Means are provided to prevent any leakage from inlet 12 to outlet 14. To this end, cavity 16 is formed with a cylindrical wall portion 150 and cartridge body 20 is formed with a cylindrical projection 152, the outer diameter of which is substantially the same as the diameter of wall portion 150. An O-ring 154 is positioned in an annular recess 156 in the outer side of cylindrical projection 152. When control cartridge 18 is positioned within casing 10, cylindrical projection 152 is placed adjacent cylindrical wall 150 so that O-ring 154 is compressed to thereby provide an effective seal between cylindrical projection 152 and cylindrical wall 150.

The thermostatic control valve is provided with means for effecting different temperature settings at which the actuating member 46 will be operative to actuate the snap-acting valve 111 and the throttle valve 91 through the controlling positions thereof as will be hereinafter described. Such means takes the form of a stop member 158 frictionally locked to temperature adjusting plug 48 by lock nut 160. A temperature setting dial 161 is attached to cartridge body 20 by means of a dial screw 162 and a spring 164. Dial screw 162 is threaded into lock nut 160. A downwardly extending rib portion 166 of dial 161 engages a flange 168 on stop member 158 whereby rotation of dial 161 causes a corresponding rotation of stop member 158 and temperature adjusting plug 48. As temperature adjusting plug 48 threadedly engages actuating member 46, this rotation of plug 48 will cause vertical movement of actuating member 46. Hence, by vertically adjusting actuating member 46 with respect to bellows 37, the amount of bellows movement required to move the actuating member 46 to a particular controlling position can be preset.

As is illustrated in FIGS. 5 and 6, the thermostatic control valve is provided with a throttle valve by-pass between inlet chamber 79 and outlet 14. A passageway 170 connects snap-action chamber 126 to a by-pass valve cavity 172 where a threadedly mounted by-pass valve 174 (see FIG. 6) adjustably meters a suitable flow and can provide a fixed minimum orifice if desired. An O-ring 176 is utilized to add rotational drag to prevent by-pass valve 174 from changing its setting. A cap and gasket 178 prevents gas leakage and an outlet passage 180 connects by-pass valve cavity 172 to the outlet 14. The throttle valve by-pass flow will thus be from inlet chamber 79, through openings 108 in cage 106, through snap-acting valve 111, through the four segmented spaces between square valve stem 116, and the interior of hollow stem 98 into snap-action chamber 126, through passageway 170 into by-pass valve cavity 172, through adjustable by-pass valve 174, and finally through outlet passageway 180 to outlet 14.

As is illustrated in FIGS. 4, 5, and 7, the thermostatic control valve is provided with a manually selectable by-pass means between inlet chamber 79 and outlet 14. The by-pass means includes a passageway 182 connecting inlet chamber 79 with a valve chamber 184, a manually operable valve 186 for controlling the flow through passageway 182, and a passageway 188 connecting valve chamber 184 to by-pass valve cavity 172.

As shown in FIG. 7, the manually operable valve 186 comprises a valve member 190 secured by riveting or other suitable means into one end of a cylindrical valve stem 192 and is arranged to cooperate with a valve seat 194 communicating with passageway 182. Valve stem 192 is slidably mounted within a bore 196 in a body member 198 which is threaded into casing 10 to frictionally lock on shoulders 199 and has an annular projection 200 extending toward valve chamber 184. An O-ring 202 is positioned about valve stem 192 between annular projection 200 and a washer 204 also on valve stem 192 and seals valve chamber 184.

A spring 206, mounted in compression between washer 204 and the innermost side 208 of valve member 190, biases the valve stem 192 downwardly so that valve member 190 engages valve seat 194 when valve member 190 is in the closed position thereof as shown in FIG. 5. With the valve member 190 in this position, a pin 210 secured in a laterally extending position on valve stem 192 is positioned in a groove 212 formed in a raised boss 214 on body member 198. A knurled knob 216 formed on the outermost end of stem 192 is used to move the valve member 190 to the open position thereof away from valve stem 194. By manually raising the valve stem 192 and rotating the same 90°, the pin 210 can be seated on the top 218 of raised boss 214 to maintain the valve member 190 in the open position thereof against the bias of spring 206.

In operation, the temperature adjusting plug 48 is adjusted to a desired dial reading by rotation of temperature adjustment dial 161. When the control valve is in the fully closed position as shown in FIG. 2, bellows 37 has expanded to move actuating member 46 upwardly and compress power spring 52 between cover 30 and flange 54 of actuating member 46. As the bulb temperature falls, the bellows 37 contracts allowing power spring 52 to force actuating member 46 downwardly. Downward movement of actuating member 46 will force legs 62 and 64 against thrust plate 146 and throttle lever 58, respectively. As thrust plate 146 and throttle lever 58 are spherically pivoted, they will be self-aligning against legs 62 and 64, respectively.

As bellows 37 continues to contract, its motion will not be transmitted to either the throttle valve 91 or the snap-acting valve 111 until the clicker 138 snaps overcenter. Valve spring 104, lever spring 89, spring 120, and gas pressure continue to hold the valves closed. Flexure develops at the periphery of thrust plate 146 because of the resistance of clicker 138 to the increasing snap-over force produced by downward movement of actuating member 46 under the action of power spring 52. When clicker 138 can no longer resist the force of power spring 52, it snaps overcenter forcing fulcrum lever 144 against abutment pin 122 causing valve disc 114 to seek to compress spring 120. This effort will overcome the lighter force spring 104.

Calibrating screw 66 is so adjusted on throttle lever 58 that when clicker 138 snaps overcenter to open the snap-acting valve 111, there will be an appreciable amplified downward motion simultaneously transmitted to throttle lever 84 through rod 80 to move throttle lever 84 to an initial open position. This relieves the upward force of spring 104 on valve disc 96 and allows valve disc 96 to move downward under the force of downwardly moving snap-acting valve disc 114 and spring 120. When the throttle valve disc 96 comes to rest by engagement of the base portion 110 of cage member 106 with throttle lever 84 in its initial open position, the throttle valve 91 will be in its initial open position and the snap-acting valve 111 will complete its opening under the action of fulcrum levers 144 compressing spring 120. Hence, the initial gas flow will be permitted.

The initial open position of throttle lever 84 is adjustable by calibrating screw 66 to give any desired amount of initial valve opening. Initial flow of 50% of capacity is considered to be a desirable condition. After this initial valve opening, further contraction of bellows 37 would cause increased downward movement of throttle lever 84 and further opening of throttle valve 91. The increased loading of thrust plate 146 and clicker 138 would eventually reach a point which limits further valve opening. This is the fully open position.

On throttling down from the fully open position, bellows 37 expands in response to the increasing bulb temperature and moves actuating member 46 upwardly against the bias of power spring 52. This results in upward movement of throttle lever 84 under the bias of spring 89 to cause throttle valve 91 to gradually close. The throttle valve 91 will gradually move to the closed position thereof as the clicker 138 is moved through its return graduating movement so that the throttle valve 91 will close before the clicker 138 snaps overcenter. With the throttle valve 91 closed and the snap-acting valve 111 open, the valve is in the minimum flow position in which a greatly reduced flow passes through throttle valve bypass as was previously described.

Further expansion of bellows 37 at this point will cause the clicker 138 to snap overcenter to its inactive position thereby allowing snap-acting valve 111 to close under the bias of spring 120. At this point, the only flow from inlet chamber 79 to outlet 14 may be through the manually operable by-pass as was previously described.

It will be apparent that during the above movement of bellows 37, self-aligning thrust plate 146 which is positioned between bellows 37 and clicker 138 serves as a follow-through spring. As the bellows 37 contracts, it supports a decreasing portion of the load of power spring 52 and an increasing portion of this load is transmitted to thrust plate 146 which is deflected proportionately. When the resisting force of clicker 138 is overcome, the thrust plate deflection is converted into clicker follow-through movement. Simultaneously, bellows 37 again picks up more of the load of power spring 52 and the snapped-over clicker 138 picks up a portion. Continued contraction of bellows 37 will proportionately increase the load on thrust plate 146 and clicker 138. Without the thrust plate 146, when clicker 138 snaps over, the clicker resisted load of power spring 52 will instantly be transmitted to bellows 37 with the result that there would be comparatively little follow-through movement allowed to assist clicker 138. This lack of resilient follow-through results in a low movement and weak force clicker action.

Referring now to FIG. 8, the modified form of control cartridge illustrated therein is similar to the snap-throttle control cartridge 18 previously described except that the valve means is a simple snap-acting valve, the thermostatic means is a heat motor and the manually selectable valve opener controls the snap-acting valve. The electric control cartridge 220 is adapted to be mounted in cavity 16 in casing 10 in the same manner as the snap-throttle control cartridge 18 and comprises a body 222 having a centrally located valve guide portion 223, an O-ring seal retaining groove 224 with an O-ring 225 therein, an inlet area 226, and an outlet area 227.

The valve assembly includes a valve stem 228 slidable within valve guide 223 and having an abutment pin 230 threaded into one end thereof and a valve disc 232 mounted on the other end thereof. A valve seat 234 is formed in a partition wall 236 dividing inlet area 226 from outlet area 227. Valve disc 232 is biased into engagement with valve seat 234 by a spring 238 mounted in compression between a valve disc 232 and a narrow retaining strip 240 mounted in inlet area 226 on cartridge body 222.

Mounted adjacent abutment pin 230 is a conventional snap-action mechanism 242 in which a clicker disc moves between an inoperative and an operative position through an overcenter position with a snap action in response to an applied force. The snap-action mechanism 242 is retained in a recess 244 formed in cartridge body 222 by a retainer and seal assembly 246 and includes an operating button 248 extending outwardly of recess 244 for a purpose to be hereinafter described. Spring 238 and snap-action mechanism 242 cooperate to move valve 232 between an open and a closed position relative to valve seat 234 to control the flow between inlet area 226 and outlet area 227.

Means are provided for actuating the snap-action mechanism 242 between its controlling positions. Such means take the form of a thermal-electric motor 250 having an element expansible and contractible in response to temperature variations in the space to be heated. As thermal-electric motors of this type are well known in the art, only a brief description is deemed necessary.

Thermal-electric motor 250 comprises an expansible rod 251 mounted between operating button 248 and an adjusting screw 252 threaded into a support member 254 attached to cartridge body 222 by screws 256. A lock washer 258 and a lock nut 260 maintain adjusting screw 252 in its adjusted position. A terminal panel 262 is attached to cartridge body 222 by means of screws (not shown) and has a suitable number of electric terminals 264 mounted thereon. A pair of lead wires 266 connect a resistance wire 263 wound around expansible rod 251 to terminals 264. In this arrangement, the circuit through the thermal-electric motor 250 is controlled by a thermostat (not shown) responsive to the temperature of the space to be controlled.

In operation, when the circuit through the resistance wire 263 is closed by action of the thermostat, current through a resistance wire 263 increases its temperature thereby heating expansible rod 251. As rod 251 is heated, it expands longitudinally and such movement is transmitted to operating button 248 of snap-action mechanism 242. When snap-action mechanism 242 passes its overcenter postion, it abuts adjusting screw 230 causing movement of valve disc 232 to its open position against the bias of spring 238. This permits a flow of fluid from inlet area 226 to outlet area 227. When the demand for heat is satisfied and the thermostat opens the circuit through resistance wire 263, rod 251 is allowed to cool and thus will contract and allow snap-action mechanism 242 to move to its relaxed position so that valve disc 232 is moved to its closed position under the bias of spring 238.

Means are provided for opening the valve assembly in the event of current failure. This means takes the form of a manually selectable valve opener 268 comprising a selector shaft 270 having a knob 272 and a laterally extending stop member 274 on one end thereof and being slidably mounted in a plug member 276 threadedly mounted in cartride body 222. A washer 277 is keyed to selector shaft 270 and an O ring 278 is mounted on selector shaft 270 adjacent washer 277. A spring 280 biases O-ring 278 against washer 277 and is mounted in compression between a washer 279 above O-ring 278 and plug member 276 so as to bias selector shaft 270 downwardly.

Selector shaft 270 is also slidable within a bore 282 in cartridge body 222 and extends downwardly into engagement with the free end 284 of a U-shaped lever 286 which straddles valve stem 228 and valve guide portion 223, and is pivoted on pin 288 secured to cartridge body 222. Lever 286 has an abutment portion 290 which engages a shoulder 292 on valve stem 228. A torsion spring (not shown) is mounted on pin 288 to bias lever 286 into engagement with selector shaft 270.

The stop portion of manually selectable valve 268 is identical to that previously described with respect to FIG. 5. Stop member 274 can rest on top shoulder 296 formed on plug member 276 or drop through slots 298 to rest on lower shoulder 300. The controlling position is determined by raising or lowering the selector shaft 270 and rotating the same to one of two 90° positions.

In the event of current failure, by 90° rotation of selector shaft 270, manually selectable valve 268 could be released from its upper position as shown in FIG. 8 in which lever 286 permits valve disc 232 to move to its closed position. Spring 280 will then force selector shaft 270 downwardly thereby causing downward movement of lever 286 which in turn would move valve disc 232 to an open position thereof. This will permit a flow of fuel from inlet area 226 to outlet area 227.

It is to be understood that although several embodiments of this invention have been shown and described, the invention can be variously embodied and changes can be made in the construction and arrangement of parts without departing from the scope of the invention as defined by the appended claims.

We claim:

1. A fluid flow control device comprising, in combination, a casing having an inlet and an outlet intersected by a valve seat, a throttle valve member cooperable with said seat for controlling flow of fluid from said inlet, a hollow valve stem carried by said valve member and defining a second valve seat, a snap valve member cooperable with said second valve seat for controlling flow of fluid from said inlet through said hollow valve stem, snap acting means for said snap valve member including a stem portion guided within said hollow valve stem and adapted for passage of fluid thereby, means for biasing said snap valve member toward engagement with said second valve seat, a pair of lever means operatively associated with said snap acting means and said biasing means respectively including means for biasing said throttle valve member toward engagement with the first said valve seat, condition responsive means including means for actuating said snap acting means and the one said lever means operatively associated therewith, and an operative connection between said one and the other of said pair of lever means for causing actuation of the other said lever means by said condition responsive means whereby said snap acting means is effective for first overcoming said biasing means for said snap valve member and thereafter said biasing means for said throttle valve member.

2. A fluid flow control device comprising, in combination, a casing having an inlet and an outlet intersected by a valve seat, a throttle valve member cooperable with said seat for controlling flow of fluid from said inlet, a hollow valve stem carried by said valve member and defining a second valve seat, a snap valve member cooperable with said second valve seat for controlling flow of fluid from said inlet through said hollow valve stem, snap acting means for said snap valve member including a stem portion guided within said hollow valve stem and adapted for passage of fluid thereby, means for biasing said snap valve member toward engagement with said second valve seat, a pair of lever means operatively associated with said snap acting means and said biasing means respectively including means for biasing said throttle valve member toward engagement with the first said valve seat, condition responsive means including means for actuating said snap acting means and the one said lever means operatively associated therewith, an operative connection between one and the other of said pair of lever means for causing actuation of the other said lever means by said condition responsive means, and adjusting means for said connection for selectively rendering said snap acting means effective for first overcoming said biasing means for said snap valve member and thereafter said biasing means for said throttle valve member.

3. A fluid flow control device comprising, in combination, a casing having an inlet and an outlet intersected by a valve seat, a throttle valve member cooperable with said seat for controlling flow of fluid from said inlet, a hollow valve stem carried by said valve member and defining a second valve seat, a snap valve member cooperable with said second valve seat for controlling flow of fluid from said inlet through said hollow valve stem, snap acting means for said snap valve member including a stem portion guided within said hollow valve stem and adapted for passage of fluid thereby, means for biasing said snap valve member toward engagement with said second valve seat, actuating means having a portion operatively engaging said snap acting means, a pivoted lever operatively engaged by another portion of said actuating means, a second pivoted lever operatively associated with said biasing means, means carried by said second lever for biasing said throttle valve member toward engagement with the first said valve seat, condition responsive means operatively associated with said actuating means for actuating said snap acting means and the first said pivoted lever, and an operative connection between said first and second levers for causing actuation of the second said lever by said condition responsive means whereby said snap acting means is effective for first overcoming said biasing means for said snap valve member and thereafter said biasing means for said throttle valve member.

4. A fluid flow control device comprising, in combination, a casing having an inlet and an outlet intersected by a valve seat, an apertured partition in said casing overlying said valve seat and defining a chamber, a throttle valve member cooperable with said seat for controlling flow of fluid from said inlet, a hollow valve stem on said valve member extending through said aperture and defining a second valve seat, a snap valve member cooperable with said second valve seat for controlling flow of fluid from said inlet through said hollow valve stem, snap acting means in said chamber including a stem portion guided within said hollow valve stem and adapted for passage of fluid thereby to said chamber, said partition having a passage for fluid from said chamber to said outlet, means for biasing said snap valve member toward engagement with said second valve seat, actuating means having a portion operatively engaging said snap acting means, a pivoted lever operatively engaged by another portion of said actuating means, a second pivoted lever operatively associated with said biasing means, means carried by said second lever for biasing said throttle valve member toward engagement with the first said valve seat, condition responsive means operatively associated with said actuating means for actuating said snap acting means and the first said pivoted lever, and an operative connection between said first and second levers for causing actuation of the second said lever by said condition responsive means whereby said snap acting means is effective for first overcoming said biasing means for said snap valve member and thereafter said biasing means for said throttle valve member.

5. A fluid flow control device comprising, in combination, a casing having an inlet and an outlet intersected by a valve seat, an apertured partition in said casing overlying said valve seat and defining a chamber, a throttle valve member cooperable with said seat for controlling flow of fluid from said inlet, a hollow valve stem on said valve member extending through said aperture and defining a second valve seat, a snap valve member cooperable with said second valve seat for controlling flow of fluid from said inlet through said hollow valve stem, snap acting means in said chamber including a stem portion guided within said hollow valve stem and adapted for passage of fluid thereby to said chamber, support means overlying said chamber, means for biasing said snap valve member toward engagement with said second valve seat, actuating means having a portion extending through said support means and operatively engaging said snap acting means, a lever pivoted on said support means and operatively engaged by another portion of said actuating means, a second lever pivoted on said casing and operatively engaging said biasing means, means carried by said second lever for biasing said throttle valve member toward engagement with the first said valve seat, condition responsive means operatively associated with said actuating means for actuating said snap acting means and the first said lever connecting means extending between said first and second levers for causing actuation of the second said lever by said condition responsive means, said connecting means including an adjustable element for selectively rendering said snap acting means effective for first overcoming said biasing means for said snap valve member and thereafter said biasing means for said throttle valve member.

References Cited in the file of this patent
UNITED STATES PATENTS

| | | |
|---|---|---|
| 1,607,363 | Prescott | Nov. 16, 1926 |
| 1,711,660 | Stephenson | May 7, 1929 |
| 1,875,511 | Shivers | Sept. 6, 1932 |
| 1,919,265 | Vaughn | July 25, 1933 |
| 2,073,168 | Newell | Mar. 9, 1937 |
| 2,087,443 | Newell | July 20, 1937 |
| 2,319,418 | Lund | May 18, 1943 |
| 2,656,983 | Grayson | Oct. 27, 1953 |
| 2,690,875 | Jenkins | Oct. 5, 1954 |
| 2,702,052 | Grayson | Feb. 15, 1955 |
| 2,733,864 | River | Feb. 7, 1956 |
| 2,743,871 | Heiser | May 1, 1956 |
| 2,777,639 | Grayson | Jan. 15, 1957 |
| 2,814,447 | Greenamyer | Nov. 26, 1957 |
| 2,825,507 | Eskin | Mar. 4, 1958 |